US012097817B2

(12) United States Patent
Elsaesser et al.

(10) Patent No.: US 12,097,817 B2
(45) Date of Patent: Sep. 24, 2024

(54) CRASH BOX CONTAINING A DEFORMABLE ELEMENT TO EXTEND THE CAPACITY OF A CRASH BOX TO ABSORB IMPACT ENERGY

(71) Applicant: CONSTELLIUM SINGEN GMBH, Singen (DE)

(72) Inventors: Robert Elsaesser, Engen (DE); Andre Mueller, Hilzingen (DE); Thomas Rebstock, Hilzingen (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 71 days.

(21) Appl. No.: 17/617,333

(22) PCT Filed: Jun. 30, 2020

(86) PCT No.: PCT/EP2020/068405
§ 371 (c)(1),
(2) Date: Dec. 8, 2021

(87) PCT Pub. No.: WO2021/001371
PCT Pub. Date: Jan. 7, 2021

(65) Prior Publication Data
US 2022/0250566 A1    Aug. 11, 2022

(30) Foreign Application Priority Data
Jul. 2, 2019   (EP) ..................... 19184021

(51) Int. Cl.
*B60R 19/34*    (2006.01)
*B60R 19/03*    (2006.01)

(52) U.S. Cl.
CPC .............. *B60R 19/34* (2013.01); *B60R 19/03* (2013.01)

(58) Field of Classification Search
CPC ................................. B60R 19/34; B60R 19/03
USPC .......................................... 293/133; 296/133
See application file for complete search history.

(56) References Cited

U.S. PATENT DOCUMENTS

| 3,863,589 | A | * | 2/1975 | Guienne | ................... E02B 3/26 |
| | | | | | 293/136 |
| 4,641,872 | A | * | 2/1987 | Lohr | ..................... F16F 9/3207 |
| | | | | | 293/133 |
| 6,099,055 | A | * | 8/2000 | Hirota | ..................... B60R 19/18 |
| | | | | | 293/120 |

(Continued)

FOREIGN PATENT DOCUMENTS

| DE | 196 03 953 C1 | 4/1997 |
| DE | 10 2015 117 005 A1 | 4/2017 |

(Continued)

OTHER PUBLICATIONS

International Search Report, dated Jul. 14, 2020, corresponding to International Application No. PCT/EP2020/068405.

*Primary Examiner* — Pinel E Romain
(74) *Attorney, Agent, or Firm* — LADAS & PARRY LLP; Malcolm J. MacDonald, Esq.

(57) ABSTRACT

A crash box (3) comprising a hollow profile (38) extending along a longitudinal direction (X) and having a crush length (LCB), said hollow profile (38) having at least two chambers (4) characterized in that it comprises at least a deformable element (7, 7', 7") contained into at least one chamber (4) contributing to the energy absorption capability of said crash box (3).

20 Claims, 8 Drawing Sheets (56) References Cited

U.S. PATENT DOCUMENTS

| | | | |
|---|---|---|---|
| 10,300,873 B2* | 5/2019 | Venkat | B60R 19/18 |
| 2005/0016807 A1 | 1/2005 | Braymand | |
| 2005/0029822 A1* | 2/2005 | Lee | B60R 19/18 |
| | | | 293/155 |
| 2010/0230983 A1* | 9/2010 | Braunbeck | B60R 19/34 |
| | | | 293/133 |
| 2012/0112479 A1* | 5/2012 | Nagwanshi | B62D 21/15 |
| | | | 428/116 |
| 2016/0245357 A1* | 8/2016 | Cazes | B60R 19/34 |
| 2017/0263957 A1* | 9/2017 | Minter | B60L 50/72 |
| 2022/0134983 A1* | 5/2022 | Chandrasekaran | B60R 19/34 |
| | | | 293/133 |

FOREIGN PATENT DOCUMENTS

| | | | | |
|---|---|---|---|---|
| FR | 2 810 941 A1 | 1/2002 | | |
| JP | 2001 058549 A | 3/2001 | | |
| JP | 2001 182769 A | 7/2001 | | |
| KR | 2016 0075190 A | 6/2016 | | |
| WO | WO-2019020268 A1 * | 1/2009 | | B60R 19/26 |

* cited by examiner

CRASH BOX CONTAINING A DEFORMABLE ELEMENT TO EXTEND THE CAPACITY OF A CRASH BOX TO ABSORB IMPACT ENERGY

FIELD OF THE INVENTION

The invention relates to a crash box comprising a hollow profile with at least two chambers and a deformable element contributing to the energy absorption of the crash box.

BACKGROUND

The term Crash Management System is generally used to describe the structural module consisting of the bumper and the related attachments which connect the bumper to the longitudinal rails of the vehicle. The main goal of a crash management system is to prevent damages following a choc between a vehicle and an obstacle.

A crash management system has the ability to absorb sufficient crash energy to meet the OEM's internal standard. In other words, the crash management system should be able to absorb energy at the start of a crash and to guide the remaining crash forces into the rest of the body structure.

A Crash Management System includes a bumper beam typically extending laterally across the front or rear end of a vehicle and provided generally for absorbing energy during a frontal or rear impact. Such bumper beams are mounted to a vehicle frame using crash boxes also called shock absorbers or deformation elements.

The speed of the vehicle during an impact influences the behavior of the crash management system. At a very low speed, the bumper beam and the shock absorbers will deform in the elastic range and resume their initial position without damage. When the impact occurs at higher speed, for example of the order of 10-15 km/hour, the bumper and the shock absorbers undergo plastic deformation. The crash management system could absorb at least in part the impact energy. This energy absorption makes it possible to protect the rest of the structure of the vehicle. At a most higher speed the crash management system could not absorb the energy in a sufficient manner and therefore the structure of the vehicle is damaged under the effect of the shock.

The crash boxes are interposed between the ends of each side member and the bumper beam. The crash boxes operate as deformation elements and convert the generated kinetic energy into deformation energy. The purpose of the integration of deformation elements into the crash management system is to control the level of force at the interfaces between the bumper system and the car body.

The crash boxes are designed to fold upon such frontal or rear impacts. In an impact, kinetic impact energy is converted into deformation work by forming folds in the deformation element itself. As a result, damage and the amount of damage can be significantly reduced. The crash box is generally made of a hollow profile having several chambers.

DE 10 2015 117 005 relates to a crash box having a plurality of hollow chambers which extend over the longitudinal extent of the crash box, a first hollow chamber being arranged offset in terms of height with respect to a second hollow chamber and a third hollow chamber in the mounted position. Here, the first hollow chamber is separated by means of a dividing wall from the second and third hollow chambers which are preferably arranged next to one another above or below the first hollow chamber.

US 2005 0016807 discloses a crash box consisting of or including an outer hollow member and internal member slideably mounted within the outer hollow member, said internal member being provided with compression reducing arms extending towards the internal surface of the outer hollow member, the compression reducing arms are provided with expandable material at their extremities adjacent to the inner surface of the hollow external member.

KR20160075190 discloses a crash box for a vehicle which is joined to both ends of the rear side of a bumper beam to make a connection between the bumper beam and a side member, and which comprises a box member which is made of a hollow member. The reinforcing member has a reinforcing tube formed on the center thereof and multiple reinforcing ribs formed on the outer circumferential surface of the reinforcing tube. The reinforcing member is inserted into the box member through the reinforcing ribs to be stacked on the interior of the box member.

FR2810941 discloses a crash management system for the front side of a vehicle comprising a bumper beam which extends in front of the vehicle and two lateral energy absorbing structures. The bumper beam and the two lateral structures have a network of cells to reduce the weight of the system. One particular rectangular cell in each of the lateral structures may comprise an insert to increase the rigidity of the energy absorbing structures and the bumper beam. In this case the insert has a honeycomb structure whose cells, of hexagonal section, are oriented longitudinally parallel to the vehicle direction.

JP2001058549 provides in a bumper for a vehicle, a part nearer to a front end part of the first aperture at a filled hollow part and a non-filled hollow part occluded at the first occlusion so that an absorbing member is prevented from falling off the first aperture.

JP2001182769 provides a shock-absorbing member equipped with body of member, formed from a metal hollow material of square tube shape, having hollow part and packing material packed in the hollow part.

Therefore, the Crash Management Systems are continuously optimized by the vehicle manufacturers who should often completely modify the Crash Management System, in particular the crash boxes, to propose a better protection or also to comply to the new requirements. The improvement proposed should not imply a too much increase of weight of the vehicle in order to have less impact as possible on the environmental aspect.

There is a need to have a flexible solution without too much development work for the producer that could be used in several vehicle and where only a part is adapted to correspond to the level to be achieved.

SUMMARY OF THE INVENTION

The present invention proposes a solution of crash box.

The present invention relates to a crash box able to absorb different levels of energy depending on the crash requirement. The crash box comprises a hollow profile in which a deformable element is present into one chamber of the hollow profile constituting the crash box.

The deformable element permits to improve the energy absorption efficiency without modifying the external geometry of the crash box and with a limited weight increase of the latter. Therefore, it is not mandatory to change the crash box when a higher level of performance is needed, it is sufficient to implement a deformable element or to adapt the design of the deformable element.

DESCRIPTION OF THE INVENTION

The shock absorbers or crash box are deformable parts, designed to fold upon such frontal or rear impacts. They generally have a shaped portion elongated in the longitudinal direction which is deformed by successive folds under the effect of the compressive force generated by the impact, according to a mode of deformation referred to as "bunching". Such a progressive formation of regular folds absorbs energy in a consistent and controlled manner.

The crash management systems are continuously optimized to answer to the requirement imposed by the legislation. The performance of a crash box is linked to its design and is a balance between the weight and the energy absorption level of the crash box.

There is a need to have a more flexible solution to control the level of performance of a Crash Management System and an easily adaptable solution to the request of the legislation.

There also remains a significant and continuing need for an improved method of manufacturing a crash box which reduces manufacturing costs and results in a crash box having improved energy absorption properties.

The problem to be solved by the invention is to improve the performance of a crash box so that it will be able to absorb more energy and also to stand higher forces without changing the hollow profile used for the crash box.

One solution to solve this problem could be to increase the wall thickness of the hollow profile, but the drawback is that the geometry of the system has to be modified, the crash box will increase in weight and the manufacturing process should be changed. It has therefore an impact on the production costs.

The solution proposed by the invention is to introduce a deformable element in the crash box to extend the capacity of energy absorption without changing the crash box itself.

Introducing an insert in a crash box is known to reinforce the screwing holes and avoid the deformation of the crash box when it is fastened to the longitudinal side rail of the vehicle. This insert is called stiffener element. Such kind of stiffener element do not participate to the impact energy absorption as it will not fold in case of impact. It is not a deformable element.

The deformable element of the invention is a separate element contained in one hollow chamber of the crash box. This deformable element will absorb additional part of the impact energy and will be deformed in case of impact. The deformable part could be considered as a load extender of the crash box.

In the description, the T, U, V corresponds to the local referential of the vehicle. T corresponds to the longitudinal axis of the vehicle, U the transverse axis, perpendicular to T axis and V the vertical axis to the surface formed by the axis T and U.

In the description, the X, Y and Z axis are related to the crash box referential. The X axis is the longitudinal direction of the crash box, the Y axis is the transversal direction of the crash box and Z axis is the vertical direction of the crash box.

Figure 1:
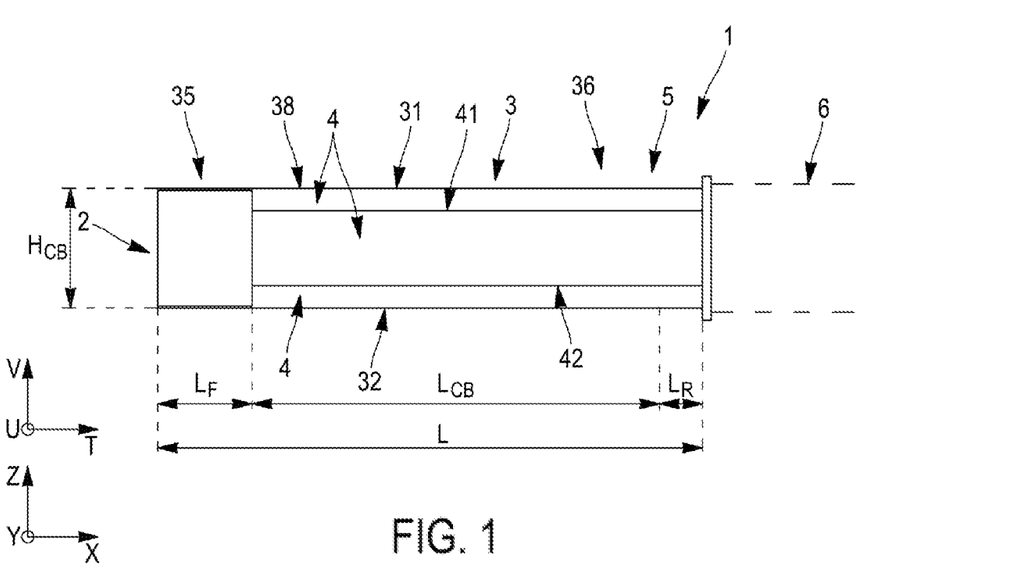
FIG. 1 is a representation of a conventional Crash Management System
Figure 2:
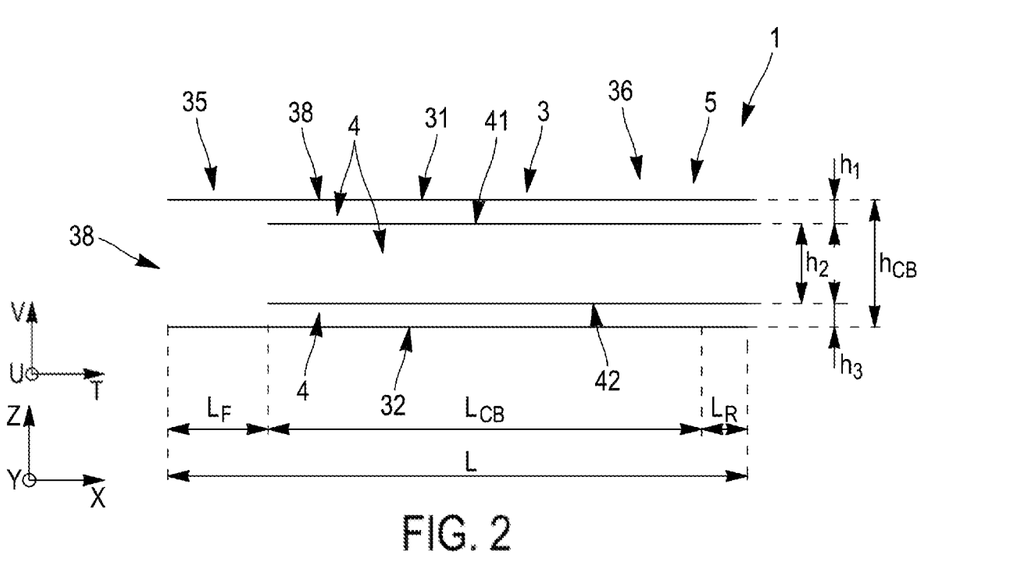
FIG. 2 is a cross section of a crash box.

As represented on FIGS. 1 and 2, the longitudinal direction of the crash box is parallel to the longitudinal direction of the vehicle T. The direction of each of the axes Y and Z is also as represented on FIGS. 1 and 2 respectively parallel to the direction of each of the axes U and V.

The crash box according to the invention comprises a hollow profile having a front side, a rear side a lower side and an upper side. The front side of the crash box is designed to be fasten to a bumper beam using attachment system. The bumper beam is positioned transversally to the car direction in the U axis direction. The rear side of the crash box is designed to be fasten to the longitudinal beam of the vehicle by means of screws which can penetrate the crash box in its entire section. A base plate may be used to link the crash box and the longitudinal beam of the vehicle.

According to the invention, the hollow profile may contain chambers. Preferably, the hollow profile may contain at least two chambers. The hollow profile extends along a longitudinal axis X. Thus the walls of the hollow profile are essentially parallel to the longitudinal axis X. In one embodiment the chambers of the hollow profile can be one on top of the other in the direction of the height of the hollow profile in the direction of the Z axis, parallel to the longitudinal direction of the X axis.

Preferably the hollow profile of the crash box of the invention is an extruded profile. The extrusion direction of the said hollow profile is parallel to the longitudinal direction of the X axis. Preferably the hollow profile of the invention has three chambers.

One particular way to attached the crash box to the bumper is by using kind of collar-type parts as an extension of upper and lower wall of the crash box creating U-shape where the bumper can be positioned and bolted. The U.S. Pat. No. 7,401,825 B2 described more in details this particular embodiment.

The crash box can be screwed or bolt to the longitudinal beam by its rear side. Holes may be machined on the rear part of the crash box to allow the screwing or bolting. To avoid any deformation of the crash box during the fastening process, inserts or stiffener element could be introduced in the rear part of the crash box allowing a safe and stable fastening. The stiffener element may penetrate the crash box transversally in its entire cross-section. They will not fold in case of impact.

The crash box may have an approximatively rectangular cross-section The length of the crash box is defined by the length of the longitudinal side walls along the direction of the X axis. The crash box according to the invention is a crash box comprising a hollow profile extending along a longitudinal direction X.

The length of the hollow profile of the invention may be divided into three parts, the front part, the rear part and the middle part, each one having a specific function. The front part is located near the front side of the hollow profile. This front part of the hollow profile of the invention may be used for the connexion of the hollow profile to the bumper. The rear part is located near the rear end of the hollow profile. This rear part of the hollow profile of the invention may be used for the connexion of the hollow profile to the longitudinal beam. The middle part is located between the front part and the rear part. This middle part defines the length of the hollow profile of the invention which could fold in case of a sufficient impact. This length may be called crush length and is parallel to the longitudinal direction of the X axis.

In a special embodiment of the invention the crush length may be the same than the length of the crash box.

The crash box of the invention may comprise a hollow profile extending along a longitudinal direction X and having a crush length, said hollow profile having at least two chambers characterized in that it comprises at least a deformable element contained into at least one chamber contributing to the energy absorption capability of said crash box. The crash box according to the invention is a crash box comprising a hollow profile extending along a longitudinal direction X and having a crush length. The hollow profile may have at least two chambers. The hollow profile may comprise at least a deformable element contained into at least one chamber contributing to the energy absorption capability of said crash box. The chamber may have a specific height in the direction of the Z axis. Preferably the height of the chamber may be the same all along the length of the chamber.

In one embodiment of the invention the hollow profile may have protrusions on the inner side walls extending in the longitudinal direction of the X axis of the hollow profile. Preferably the protrusions may be present in the chamber which contains the deformable element of the invention. The protrusions may be used to maintained the deformable element in the chamber of the hollow profile.

The chambers of the profile may be defined by a width, a length and a height that allow to define a volume for each of the chambers.

According to the invention, the crash box may contain a deformable element which could contribute to the energy absorption ability of the crash box. The deformable element of the invention may be a load extender. Preferentially, the deformable element is positioned in one chamber of the hollow profile.

According to the invention, the crash box may comprise a hollow profile with at least 2 chambers wherein the said hollow profile may comprise a deformable element and wherein the deformable element is a hollow profile comprising preferentially at least 2 chambers. In a preferred embodiment the deformable element of the invention is a hollow profile containing chambers, preferentially the hollow profile of the deformable element of the invention comprises at least 2 chambers.

According to the invention, the deformable element is an extrusion having a width $W_E$. The deformable element of the invention may be an extruded element which extrusion may have a width $W_E$. The extrusion direction E of the deformable element may be perpendicular to the longitudinal direction X of the hollow profile, and thus perpendicular to the longitudinal axis of the vehicle T. More generally the deformable element may be defined by a width, a length and a height that allow to define a volume of the latter.

The deformable element of the invention may be made of materials such as steel, plastic or aluminium alloy. Preferably the deformable element is made of aluminium alloy.

According to the invention, the walls thickness of the deformable element may be different from the walls thickness of the hollow profile of the crash box. In one embodiment at least one of the walls constituting the deformable element has a thickness different from the other walls. The geometry of the deformable element of the invention may be designed according to the level of performance to be achieved by the crash box with the constraint that the deformable element must be contained in the chamber of the hollow profile. The walls thickness of the hollow profile constituting the deformable element is a parameter that can be adapted according to the level of mechanical properties targeted. The deformable element may be constituted by walls from the same thickness or from different thickness. The walls thickness of the deformable element may be the same for all the walls or may be different from each other. The wall thickness of the deformable element may be different from the walls thickness of the hollow profile constituting the crash box. For example, the walls thickness of the deformable element may be greater or smaller than the walls thickness of the hollow profile constituting the crash box. In one embodiment of the invention, the walls thickness of the deformable element may be different from the walls thickness of the hollow profile of the crash box of the invention. In another embodiment, the at least one of the walls constituting the deformable element has a thickness different from the other walls.

According to the invention, the width of the extruded deformable element may be comprised between 20% and 150% of the crush length of the hollow profile, preferentially the width of the deformable element may be comprised between 30% and 100% of the crush length of the hollow profile. The width of the deformable element of the invention is parallel to the direction X and is function of the crush length of the hollow profile. The width of the deformable element may be smaller than the crush length of the hollow profile. Preferably the width of the deformable element is comprised between 20% and 150% of the crush length of the hollow profile. Most preferentially the width of the deformable element is comprised between 30% and 100% of the crush length of the hollow profile.

To position the deformable element in the chamber of the hollow profile constituting the crash box, the dimensions of the deformable element may be slightly smaller than the dimensions of the chamber in order to allow the deformable element to slide inside the chamber creating a small gap. The gap should be thin enough to allow the deformable element to be slipped in the chamber but should be in the same time small enough to prevent the deformable element from moving into the chamber after being positioned.

When the deformable element is in the chamber of the hollow profile constituting the crash box, interfaces areas may be created between the chamber walls and the deformable element. These interfaces areas could be considered as contact areas.

According to the invention, the deformable element may fill partially the chamber containing it. In one embodiment the deformable element may fill 20% to 98% of the chamber containing it. The presence of the deformable element in the chamber of the hollow profile constituting the crash box implies that the chamber of the hollow profile is filed by the deformable element. The chamber of the hollow profile may be filled totally, partially, or discontinuously by the deformable element depending on the geometry of the latter. A partial or discontinuous filing is defined as being when the contact between the deformable element and at least one of the wall of the chamber (upper wall, lower wall, or one of the side wall) does not exist all along the length or the height of the chamber. In one embodiment of the invention the deformable element may fills partially the chamber containing it. Preferably, the deformable element of the invention fills 20% to 98% of the chamber containing it According to the invention, the deformable element may be at least partially in contact with at least two walls of the chamber containing it. The presence of the deformable element of the invention in the chamber of the hollow profile may create contact areas with at least two opposites longitudinal walls of the chamber containing the deformable element. The contact areas may be all along a wall of the chamber, or partially along the wall of the chamber, depending on the geometry of the deformable element. A partial contact area may be defined as being when the contact between the deformable element and at least one of the wall of the chamber does not exist all along the longitudinal wall of the chamber. In one embodiment of the invention the deformable element is at least partially in contact with at least two walls of the chamber containing it. Preferentially, the deformable element is at least partially in contact with at least two opposites walls of the chamber containing it.

The length of the contact areas with the at least two walls of the chamber containing it may be between 1% and 100% of the crush length of the hollow profile. The length of the contact area, created when the deformable element is in the hollow profile, may be parallel to the direction X and may be function of the crush length of the hollow profile. Preferentially the length of the contact areas is between 1% and 100% of the crush length of the hollow profile.

According to the invention, the deformable element may be attached to the hollow profile preferentially by screws. The deformable element of the invention may be attached to the hollow profile constituting the crash box. The deformable element of the invention may have a rear end with holes to receive the screws for the attachment of the crash box to the longitudinal beam. To avoid the deformation of the holes by screwing, stiffener element may be used in the crash box. In one embodiment of the invention, the holes may have the function of stiffener elements used to fasten the crash box on the longitudinal beam. In another specific embodiment the deformable element and the at least one stiffener element may be a monolithic integrated part.

In one embodiment of the invention the rear end of the deformable element may be clipped to the stiffener element. In crash boxes where stiffener elements are inserted in the hollow chamber of the invention independently to the deformable element of the invention, the rear end of the deformable element may thus be formed in such a way to have the opposite shape to that of the stiffener element. In this specific embodiment the rear end of the deformable element is clipped to the stiffener element.

In one embodiment of the invention the protrusions on the inner side wall extending on longitudinal direction X of the chamber may be used to guide the deformable element of the invention in the chamber of the crash box.

1: Crash Management System
2: Bumper
3: Crash Box
4: Chamber of the hollow profile constituting the crash box
5: Attachment means of the crash box to the longitudinal beam
6: Longitudinal beam
7, 7', 7": deformable element
31: Upper wall of the hollow profile constituting the crash box
32 Lower wall of the hollow profile constituting the crash box
33: longitudinal side walls of the hollow profile constituting the crash box
34: longitudinal side walls of the hollow profile constituting the crash box
35: Front side area of the hollow profile constituting the crash box
36: Rear side area of the hollow profile constituting the crash box
37: collar-type part for fastening the crash to the bumper
38: Hollow profile constituting the crash box
41: Internal upper wall of the hollow chamber
42: Internal lower wall of the hollow chamber
43: Longitudinal side wall of hollow chamber
44: Longitudinal side wall of hollow chamber
45: Protrusion
71, 71': Hollow profile constituting the deformable element
711, 711', 712, 712', 713, 713', 714, 714', 715', 716': Chambers of the hollow profile
72, 72', 72": Contact area between deformable element and the upper wall of the chamber
73, 73', 73": Contact area between deformable element and the lower wall of the chamber
74, 74', 74": Contact area between deformable element and the longitudinal wall of the chamber
75, 75', 75": Contact area between deformable element and the longitudinal wall of the chamber
76, 76': stiffener element
L: length of the hollow profile constituting the crash box
$L_{CB}$: Crush length of the hollow profile constituting the crash box
$L_F$: Length of the front part of the hollow profile constituting the crash box
$L_R$: Length of the rear part of the hollow profile constituting the crash box
$L_E$, $L_E$": length of the deformable element
$W_{CB}$: width of the hollow profile constituting the crash box
$W_{CH}$ width of the chamber
$W_E$, $W_E$': width of the deformable element
$H_{CB}$: Height of the hollow profile constituting the crash box
$H_E$, $H_E$': Height of the deformable element
$H_1'$, $H_2'$, $H_3'$: Heights of the deformable element
$h_1$: Height of one chamber
$h_2$: Height of one chamber
$h_3$: Height of one chamber
E, E': Extrusion direction of the deformable element

DETAILED DESCRIPTION OF THE INVENTION

Throughout all the figures, same or corresponding elements may generally be indicated by same reference numerals. These depicted embodiments are to be understood as illustrative of the invention and not as limiting in any way.

FIG. 1 represents a Crash Management System 1 of the prior art in the local referential (T, U, V) of the vehicle. The Crash Management system 1 is represented in cross-section along the longitudinal axis T. The Crash Management System 1 is composed by a bumper 2 positioned along a transversal axis U perpendicular to longitudinal direction T. A crash box 3 is attached to the bumper 2. The crash box 3 is attached to a longitudinal beam 6 using conventional attachments means as a base plate 5.

The crash box 3 is a hollow profile 38 extruded in the longitudinal direction X. The hollow profile 38 constituting the crash box 3 is defined by a length L in the longitudinal direction X, a height $H_{CB}$ in the vertical direction Z and a width $W_{CB}$ in the transversal direction Y (shown in FIGS. 5, 9 and 10). The hollow profile 38 constituting the crash box 3 has an approximatively rectangular shape which is defined by an upper wall 31, a lower wall 32 and two longitudinal side walls 33 and 34. The walls 31, 32, 33 and 34 extend from the front side to the rear side of the crash box 3 along the X direction. The crash box 3 has a front area 35 and a rear area 36.

The length L of hollow profile 38 constituting the crash box 3 can be divided into in three parts $L_F$, $L_R$ and $L_{CB}$ corresponding to the front part, the rear part and the middle part of the hollow profile 38 constituting the crash box 3 respectively. The part $L_F$ is located near the front side of the hollow profile 38 constituting the crash box 3 and corresponds to the front side 35 area of the hollow profile 38. The part $L_R$ is located near the rear side of the hollow profile 38 constituting the crash box 3 and corresponds to the rear side area 36 of the hollow profile 38. The part $L_{CB}$ is located between the part $L_F$ and the part $L_R$ and corresponds to the crush length $L_{CB}$ of the hollow profile 38 constituting the crash box 3. The crush length $L_{CB}$ is the corresponding length of the crash box 3 which can be crushed under impact.

The hollow profile 38 constituting the crash box 3 has three chambers 4 located one on top of the other in the direction of the Z axis, perpendicular to the longitudinal direction of the X axis. The chamber 4 in the middle has an internal upper wall 41 and an internal lower wall 42.

FIG. 2 represents a Crash Management System 1 of the invention in the local referential (T, U, V) of the vehicle. The FIG. 2 represents a crash box 3 being a hollow profile 38 extending along the longitudinal direction X. The hollow profile 38 is extruded and its extrusion direction corresponds to the longitudinal direction X. The crash box 3 has an approximatively rectangular shape which is defined by an external upper wall 31, an external lower wall 32 and two longitudinal side walls 33 and 34. The walls 31, 32, 33 and 34 extend from the front side to the rear side of the crash box 3 along the X direction. The crash box 3 has a front area 35 and a rear area 36. The crash box is defined by a full length L in the longitudinal direction X, a height $H_{CB}$ in the vertical direction Z and a width $W_{CB}$ in the transversal direction Y (shown in FIGS. 5, 9 and 10).

The length L of the crash box 3 can be divided into three parts $L_F$, $L_R$ and $L_{CB}$. in the direction of the longitudinal axis X corresponding to the front part, the rear part and the middle part of the crash box 3 respectively. The part $L_F$ is located near the front side of the crash box 3 and corresponds to the front side 35 area of the crash box 3. The part $L_R$ is located near the rear side of the crash box 3 and corresponds to the rear side area 36 of the crash box 3. The part $L_{CB}$ is located between the part $L_F$ and the part $L_R$ and corresponds to the crush length of the crash box 3. The crush length $L_{CB}$ is the corresponding length of the crash box 3 which can be crushed under impact.

The crash box 3 has three chambers 4 located one on top of the other in the direction of the height $H_{CB}$ of the crash box in the direction of the Z axis, parallel to the longitudinal direction of the X axis. The three chambers 4 have different heights $h_1$, $h_2$ and $h_3$ along the direction of the Z axis. The chamber 4 in the middle has an upper internal upper wall 41 and an internal lower wall 42.

Figure 3:
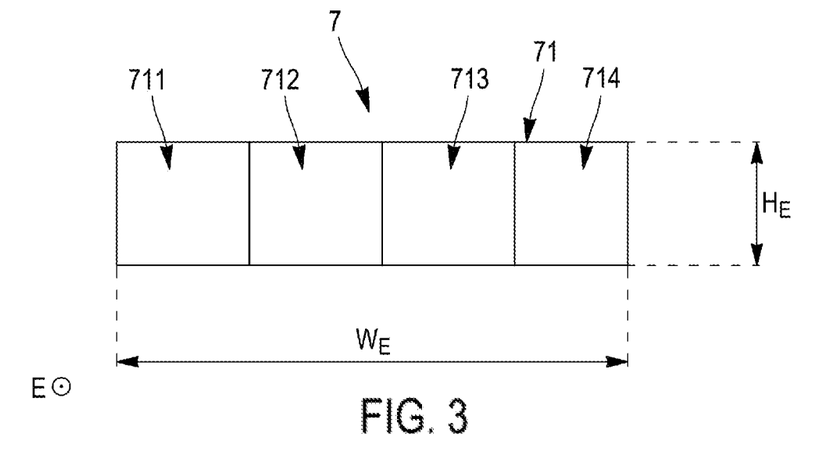
FIG. 3 is a cross section of a deformable element according to the invention

The FIG. 3 represents one particular embodiment of a deformable element 7. It is extruded with an extrusion direction E. The deformable element which is defined by a width $W_E$ perpendicular to the extrusion direction E, a length $L_E$ (shown in FIG. 5) parallel to the extrusion direction E and a height $H_E$ perpendicular to the extrusion direction E. The extruded deformable element 7 of the FIG. 3 is a hollow profile 71 with four chambers 711, 712, 713, and 714.

Figure 4:
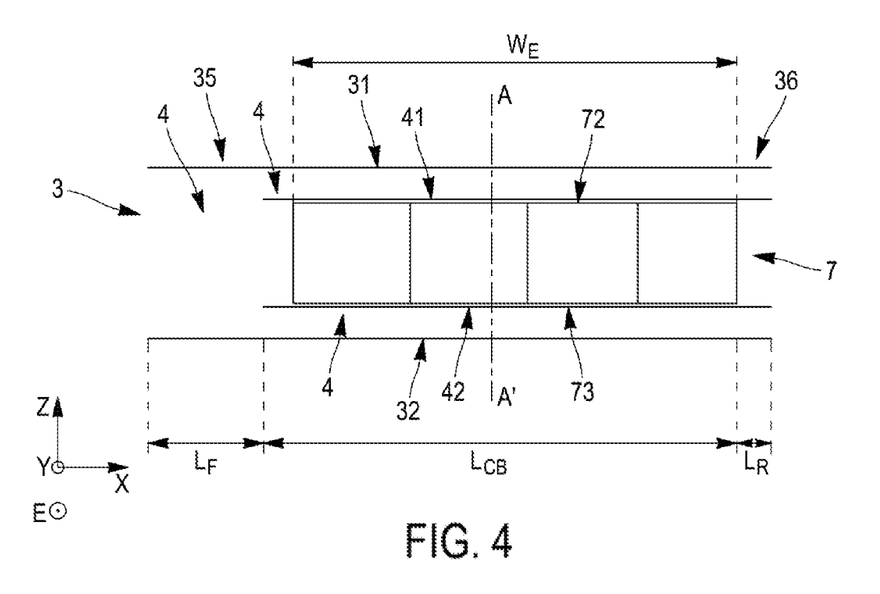
FIG. 4 is a cross section of the hollow profile of the crash box containing a deformable element of the invention.
Figure 5:
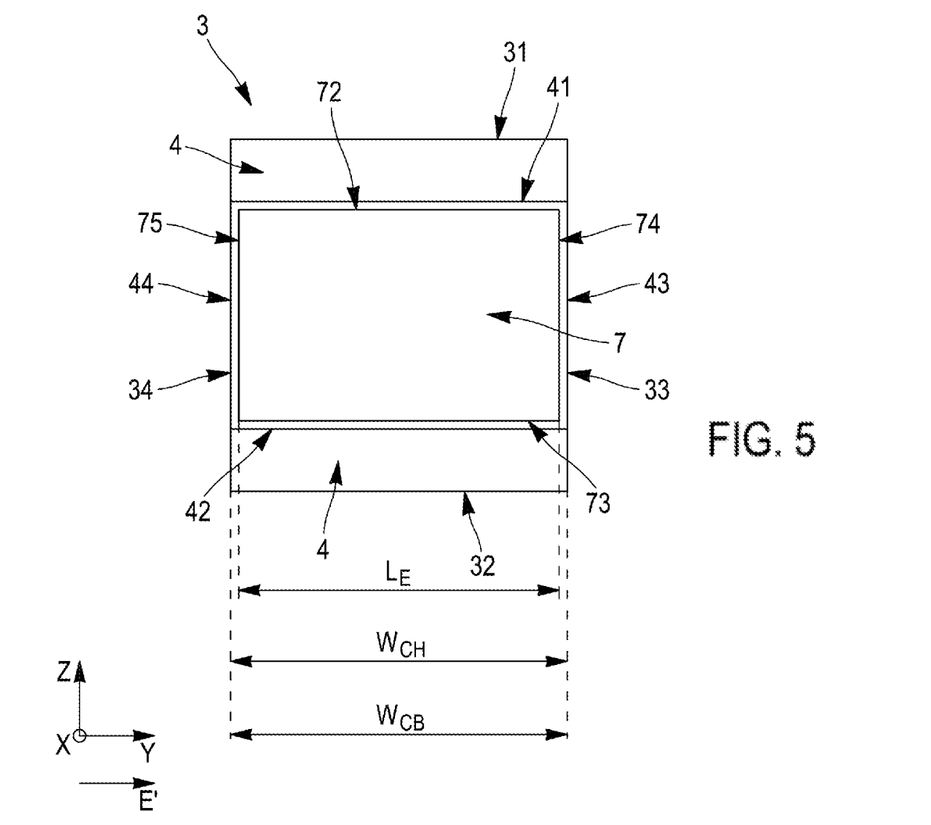
FIG. 5 is a cross section of the representation of the FIG. 3 along the line A-A'.

The FIG. 4 represents the crash box 3 of the FIG. 2 with three chambers 4, one of which containing the deformable element 7 of the invention. The deformable element 7 is positioned into one of the chamber 4 of the hollow profile 38 in such a way that the extrusion direction E of the deformable element 7 is perpendicular to the longitudinal direction X. The height $H_E$ of the deformable element 7 is slightly smaller than the height $h_2$ of the chamber 4, in which the deformable element 7 is introduced, to allow the introduction of the deformable element 7 in the chamber 4 of the hollow profile 38 constituting the crash box 3. The deformable element creates interface areas with four walls 41, 42, 43 and 44 of the chambers 4. The FIG. 4 shows only the walls 41 and 42. The width $W_E$ of the deformable element 7 is smaller than the crush length $L_{CB}$ of the crash box 3 and consequently fills only partially the chamber 4. The position of the deformable element 7 in the chamber 4 creates interfaces areas with the four walls 41, 42 43 and 44 that could be considered as contact areas 72, 73, 74 and 75 (the contact areas 74 and 75 are shown in FIG. 5). The interfaces area 72 and 73 with the walls 41 and 42 could be considered as contact areas as the height differences between the height $H_E$ of the deformable element 7 and the height $h_2$ of the chamber 4 is very small. In this embodiment each contact areas 72 and 73 are continuous along the longitudinal direction X.

The FIG. 5 is a cross section in the height along the AA' line of the FIG. 4. The FIG. 5 presents the crash box 3 with three chambers 4 one of which containing a deformable element 7 of the invention. The chambers 4 containing the deformable element 7 has four walls 41, 42 43 and 44. The position of the deformable element 7 in the chamber 4 creates interfaces areas with the four walls 41, 42 43 and 44 that could be considered as contact areas 72, 73, 74 and 75. The interfaces areas with the walls 41 and 42 could be considered as contact areas 72 and 73 as the height differences between the height $H_E$ of the deformable element 7 and the height $h_2$ of the chamber 4 is very small. In this embodiment each contact areas 72 and 73 are continuous along the longitudinal direction X. The interfaces areas with the walls 43 and 44 could be considered as contact areas 74 and 75 as the differences between the length $L_E$ of the deformable element 7 and the width $W_{CH}$ of the chamber 4 is very small. In this embodiment each contact areas 72, 73, 74 and 75 are continuous along the longitudinal direction X.

Figure 6:
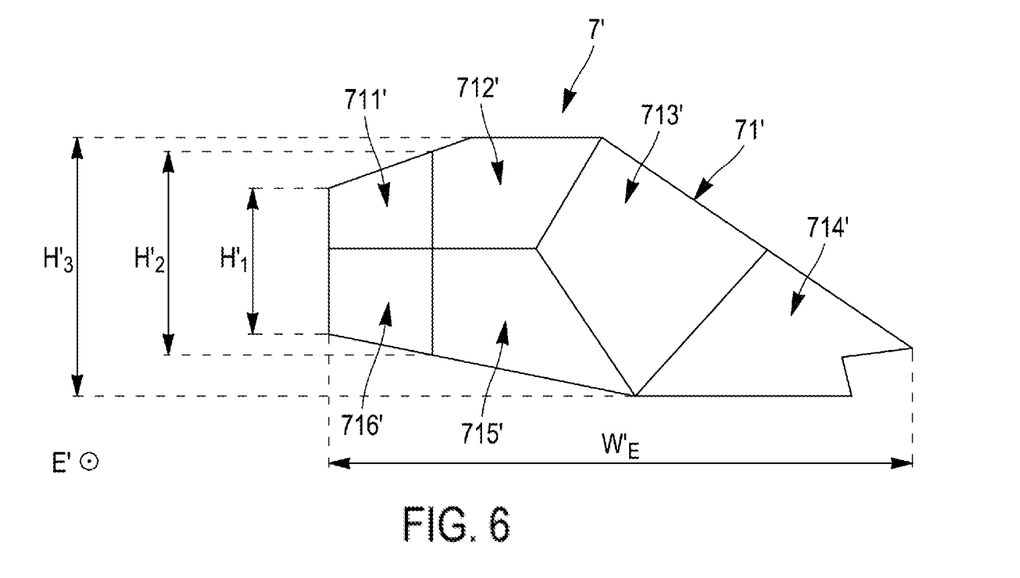
FIG. 6 is a cross section of a deformable element according to the invention.

The FIG. 6 presents another particular embodiment of the deformable element 7'. The deformable element 7' is extruded with an extrusion direction E'. The deformable element 7' is defined by a width $W_E$ and heights $H_1'$, $H_2'$, $H_3'$.

Due to the geometry of the deformable element 7', the height is not the same along the width $W_E$ of the deformable element 7'. The extruded deformable element 7' is a hollow profile 71' with six chambers (711', 712', 713', 714', 715', 716').

Figure 7:
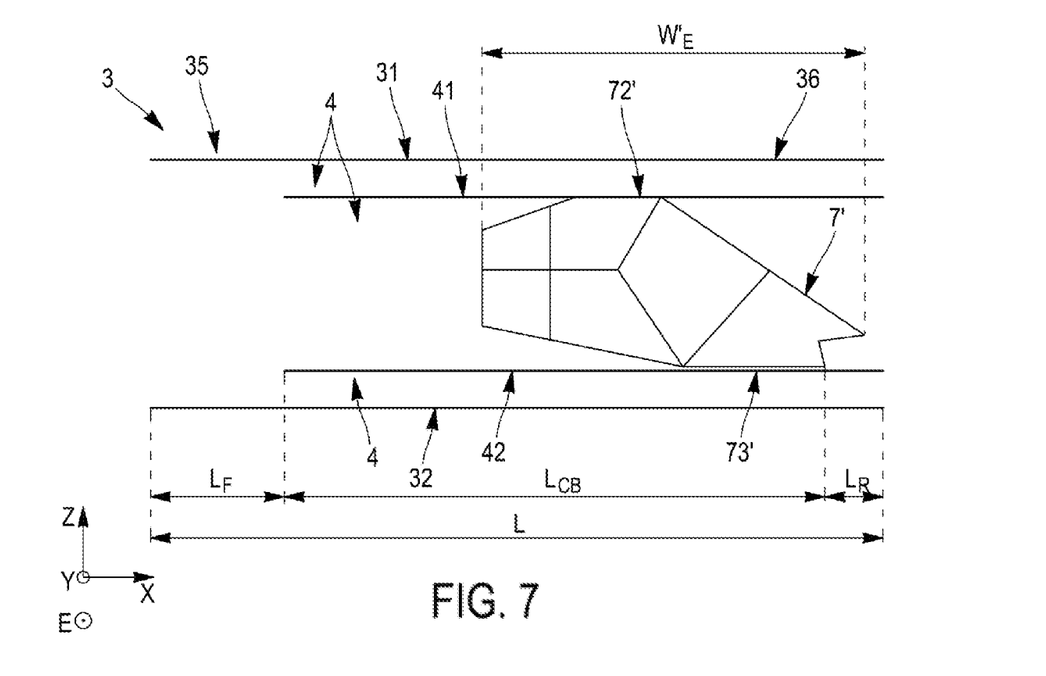
FIG. 7 is a cross section of the hollow profile of the crash box containing a deformable element of the invention.

The FIG. 7 represents the hollow profile 38 constituting the crash box 3 with three chambers 4 one of which containing the deformable element 7' of the FIG. 6. The position of the deformable element 7' in one of the chamber 4 of the hollow profile 38 creates interfaces areas, that could be considered as contact areas 72' 73' 74' and 75', with four walls 41, 42, 43 and 44 of the chambers 4. The FIG. 7 shows only the wall 41 and 42 and the contacts areas 72' and 73'. The contact area 72' is discontinuous along the wall 41 in the longitudinal direction X. The contact area 73' is discontinuous along the wall 42 in the longitudinal direction X. The contact area 72' and 73' are preferably offset from each other along the X axis. The width $W_E$' of the deformable element 7' is smaller than the crush length $L_{CB}$ of the crash box 3.

The deformable element 7' fills only partially the chamber 4 in the direction longitudinal X and also in the vertical direction Z'.

Figure 8:
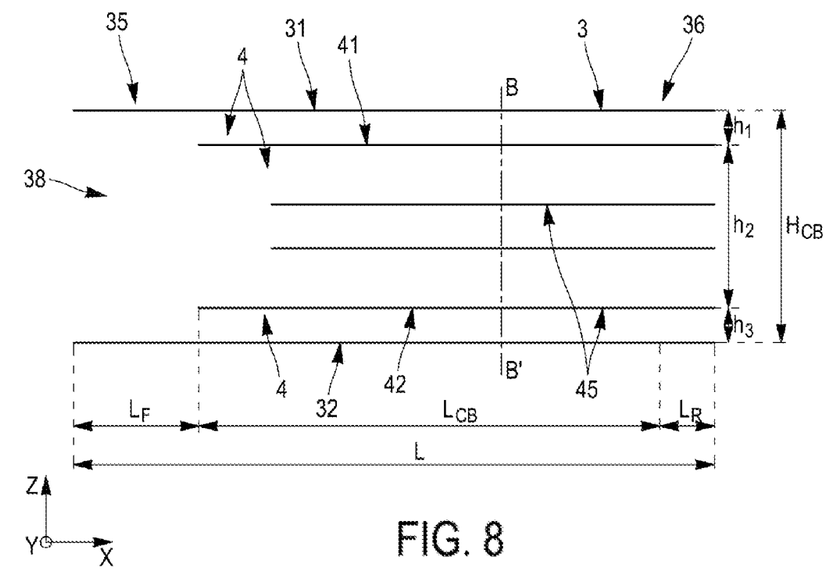
FIG. 8 is a cross section of a hollow profile of the crash box with protrusion constituting the crash box.

The FIG. 8 represents the crash box 3 of the FIG. 2 with protrusions 45 on the inner side walls 33 and 34 of one of the chamber 4 of the hollow profile 38 constituting the crash box 3. The crash box 3 has three chambers 4.

Figure 9:
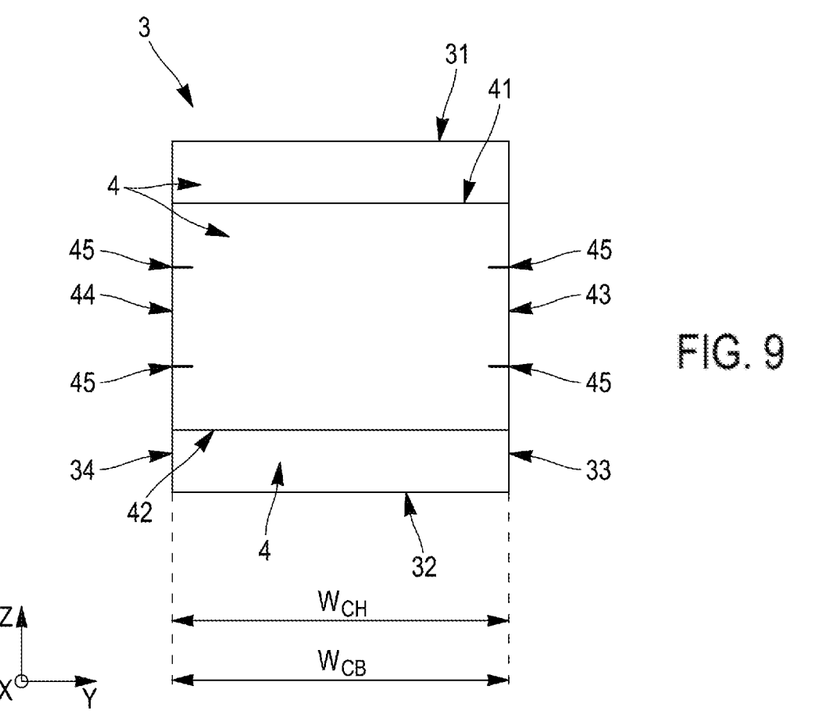
FIG. 9 is a cross section of the representation of the FIG. 7 along the line B-B'.

The FIG. 9 is a cross section in the height along the B-B' line of the FIG. 8. The protrusions 45 extend along the longitudinal direction X, parallel to the longitudinal direction X.

Figure 10:
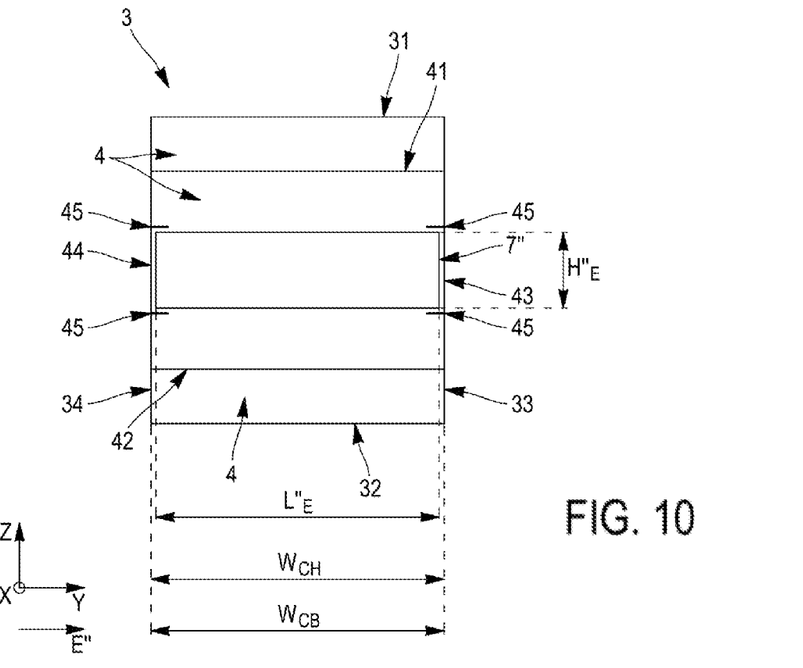
FIG. 10 is a cross section of the hollow profile of the FIG. 7 containing a deformable element of the invention.

The FIG. 10 represents the crash box 3 of the FIG. 9 with protrusions 45 on the side walls 43 and 44 of the chamber 4 into the hollow profile 38 constituting the crash box 3. The chamber 4 having the protrusion 45 contains the deformable element 7" of the invention. The protrusions 45 play the role of guiding line all along them. The deformable element 7" is extruded with an extrusion direction E". The deformable element 7" is defined by a length $L_E$" and height $H_E$". The position of the deformable element 7" in one of the chamber 4 of the hollow profile 38 creates interfaces areas, that could be considered as contact areas 72" and 73 ", with the longitudinal walls 43 and 44 of the chambers 4. In this embodiment each contact areas 72", 73", 74" and 75" are continuous along the longitudinal direction X. The height $H_E$" of the deformable element 7" is smaller than the height $h_2$ of one the chamber 4 of the hollow profile 38 constituting the crash box 3. The deformable element 7" fills only partially the chamber 4 in which the deformable element 7" is positioned.

Figure 11:
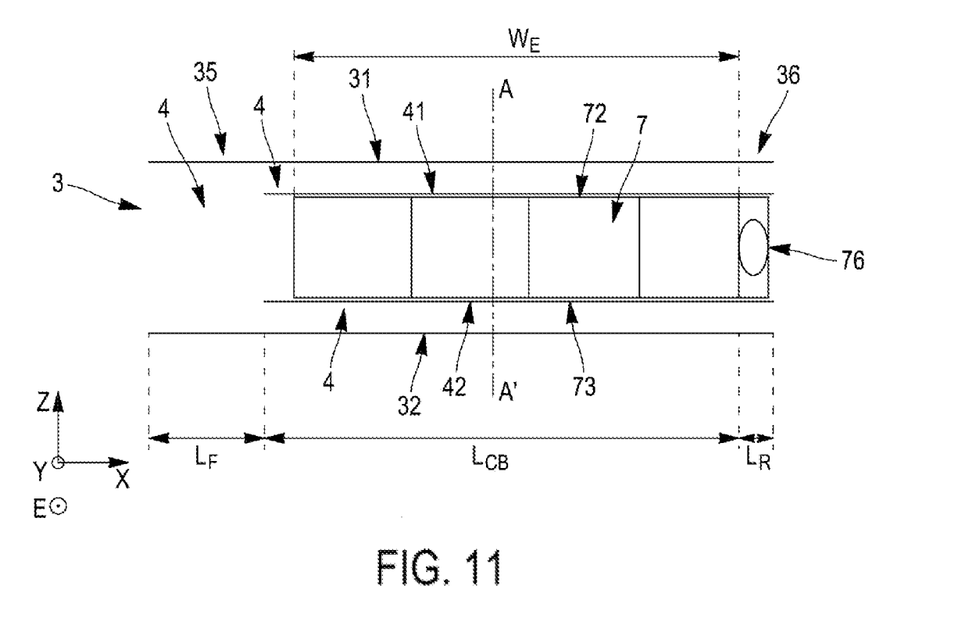
FIG. 11 is a cross section of the hollow profile of the crash box containing a deformable element of the invention having stiffener element both being a monolithic integrated part.
Figure 12:
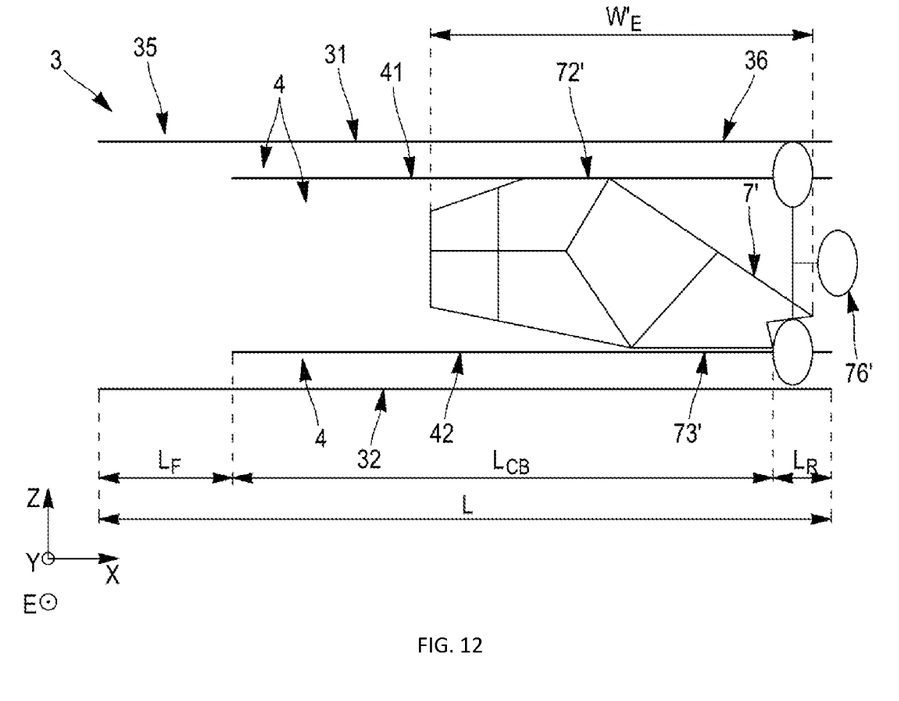
FIG. 12 is a cross section of the hollow profile of the crash box containing a deformable element of the invention and with an inserted stiffener element on which the deformable element is clipped.
Figure 13:
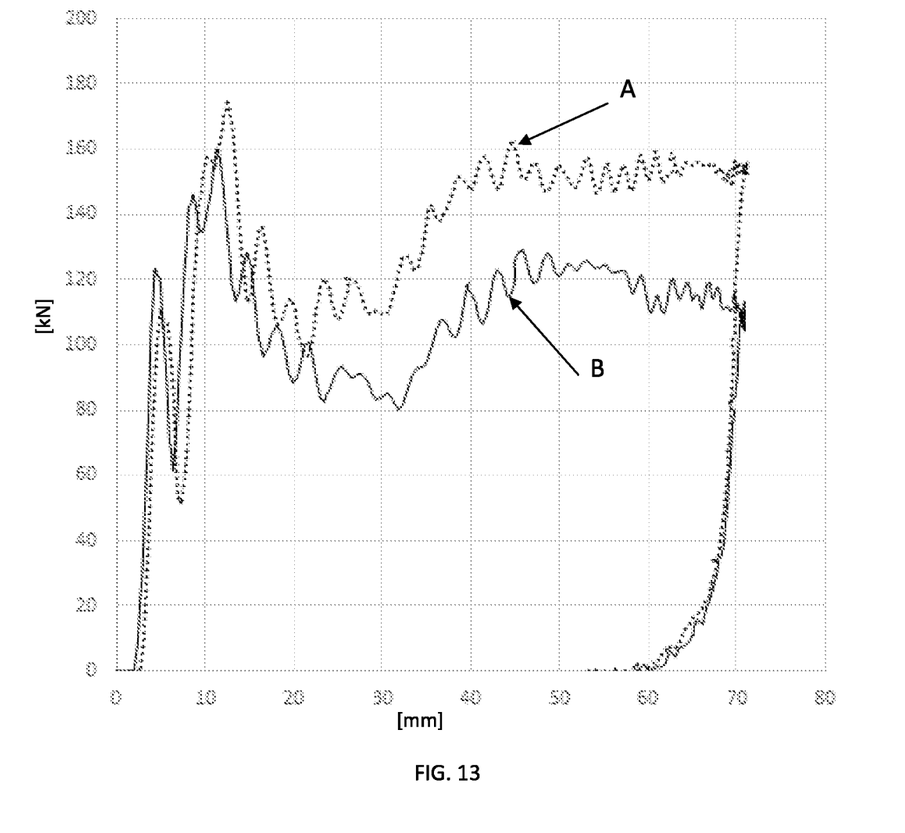
FIG. 13 is a graphic comparing the mechanical performance of a crash box without a deformable element and a crash box containing a deformable element.

FIGS. 12 and 13 show the crash boxes 3 of the FIGS. 4 and 7 in which hollow profile 38 deformable element 7 and 7' are positioned and where stiffener element 76 and 76' are shown to described the fixation of the deformable element 7 and 7' in one of the chamber 4 of the hollow profile 38 constituting the crash box 3. In the FIG. 11, the deformable element 7 and the stiffener element 76 are a monolithic integrated part. In the FIG. 12, the rear end of the deformable element 7' is clipped to the stiffener element 76'.

The FIG. 13 shows the level of the force of crash boxes 3 according to the invention tested in comparison to the crash without deformable element. The X axis corresponds to the deformation of the crash box in millimetre [mm] and the Y axis corresponds to the Force in Kilonewton [kN]. The curve [A] represents the level of force deforming the crash box 3 containing the deformable element 7. The curve [B] represents the level of force deforming the crash box 3 without the deformable element 7. It can be seen clearly that the force profile is different for the same crash box 3 with the deformable element 7 (curve [A]) and without the deformable element 7 (curve [B]). This makes it clear, that a higher level of force is needed to deform the crash box 3 containing the deformable element 7. With a deformable element 7 the impact energy absorbed by the crash box 3 containing the deformable element 7 is higher.

The invention claimed is:

1. A crash box for a vehicle, comprising:
   a hollow profile extending along a longitudinal direction and having a crush length,
   said hollow profile having at least two chambers, and
   a deformable element contained in at least one chamber of the at least two chambers.

2. The crash box according to claim 1, wherein the deformable element is an extrusion having a width.

3. The crash box according to claim 2, wherein an extrusion direction of the deformable element is perpendicular to the longitudinal direction of said hollow profile.

4. The crash box according to claim 1, wherein the deformable element is a hollow profile comprising at least two chambers.

5. The crash box according to claim 2, wherein the width of the deformable element is between 20% and 150% of the crush length of the hollow profile.

6. The crash box according to claim 1, wherein the deformable element partially fills the at least one chamber.

7. The crash box according to claim 1, wherein the deformable element fills 20% to 98% of the at least one chamber.

8. The crash box according to claim 1, wherein the deformable element is attached to the hollow profile by screws.

9. The crash box according to claim 1, wherein the deformable element comprises at least one stiffener element, and wherein the deformable element and the at least one stiffener element are a monolithic integrated part.

10. The crash box according to claim 1, wherein the hollow profile comprises at least one stiffener element inserted in the hollow profile, and wherein a rear end of the deformable element is attached to the stiffener element.

11. The crash box according to claim 1, wherein deformable element is at least partially in contact with at least two walls of the at least one chamber containing it, preferentially the at least two walls are opposites walls.

12. The crash box according to claim 1, wherein a length of the contact areas with the at least two walls of the at least one chamber, is between 1% and 100% of the crush length of the hollow profile.

13. The crash box according to claim 1, wherein the deformable element is made of plastic, steel or aluminium alloy.

14. The crash box according to claim 1, wherein said hollow profile has three chambers.

15. The crash box according to claim 1, wherein said hollow profile is an extruded profile.

16. The crash box according to claim 1, wherein a thickness of a wall of the deformable element is different from a thickness of a wall of the hollow profile.

17. The crash box according to claim 1, wherein a wall of the deformable element has a thickness that is different from a thickness of another wall of the deformable element.

18. The crash box according to claim 5, wherein the width of the deformable element is between 30% and 100% of the crush length of the hollow profile.

19. The crash box according to claim 1, wherein the hollow profile extends longitudinally along a longitudinal axis of the vehicle when the crash box is mounted on the vehicle.

20. The crash box according to claim 1, wherein the hollow profile has a rectangular shape defined by an upper wall, a lower wall, and first and second side walls that extend longitudinally along a longitudinal axis of the vehicle when the crash box is mounted on the vehicle.

* * * * *